United States Patent [19]

Carbone et al.

[11] Patent Number: 5,296,183
[45] Date of Patent: Mar. 22, 1994

[54] METHOD FOR COMOLDING PROPERTY ENHANCING COATINGS TO COMPOSITE ARTICLES

[75] Inventors: John W. Carbone, Middletown; Douglas M. Hoon, Guilford, both of Conn.

[73] Assignee: Dow-United Technologies Composite Products, Inc., Wallingford, Conn.

[21] Appl. No.: 933,371

[22] Filed: Aug. 21, 1992

[51] Int. Cl.$^5$ .............................................. B29C 45/14
[52] U.S. Cl. .................... 264/131; 264/135; 264/255; 264/257; 264/265; 264/267; 264/317
[58] Field of Search ............... 264/131, 135, 221, 255, 264/257, 259, 265, 267, 274, 278, 317; 427/203, 299

[56] References Cited

U.S. PATENT DOCUMENTS

| | | | |
|---|---|---|---|
| 1,573,896 | 2/1926 | Alton | 427/203 |
| 2,388,776 | 11/1945 | Wallace | 264/274 |
| 2,454,910 | 11/1948 | Carr | 264/317 |
| 2,716,075 | 8/1955 | Wiese | 427/402 |
| 3,536,800 | 10/1970 | Hubbard | 264/317 |
| 3,591,468 | 7/1971 | Nishio et al. | 205/179 |
| 3,935,291 | 1/1976 | Jackson | 264/331 |
| 4,011,354 | 3/1977 | Drostholm et al. | 427/203 |
| 4,322,458 | 3/1982 | Siebmanns | 427/404 |
| 4,339,144 | 7/1982 | Nagasaka | 264/135 |
| 4,517,247 | 5/1985 | Suzuki et al. | 264/265 |
| 4,666,787 | 5/1987 | Bickle et al. | 427/409 |
| 4,681,712 | 7/1987 | Sakakibara et al. | 264/131 |
| 4,687,678 | 8/1987 | Lindblom | 427/453 |
| 4,770,827 | 9/1988 | Fischer | 264/51 |
| 4,777,002 | 10/1988 | Pütz | 264/255 |
| 4,795,600 | 1/1989 | Kromrey | 264/130 |
| 4,798,690 | 1/1989 | Levy | 264/1.7 |
| 4,944,908 | 7/1990 | Leveque et al. | 264/278 |
| 5,021,259 | 6/1991 | Singelyn | 427/375 |
| 5,024,711 | 6/1991 | Gasser et al. | 427/203 |
| 5,059,269 | 10/1991 | Hu et al. | 264/171 |

FOREIGN PATENT DOCUMENTS

| | | | |
|---|---|---|---|
| 59-95130 | 6/1984 | Japan | 264/221 |
| 59-225912 | 12/1984 | Japan | 264/274 |
| 1087173 | 10/1967 | United Kingdom . | |

OTHER PUBLICATIONS

Organic Finishing, Oct. 1950, Flame-spraying Plastic Coatings, by Thomas A. Dickinson.

Primary Examiner—Jay H. Woo
Assistant Examiner—Robert B. Davis
Attorney, Agent, or Firm—McAulay, Fisher, Nissen, Goldberg & Kiel

[57] ABSTRACT

A method for producing a unitary part having a property enhancing coating strongly bonded to a core of either plastic or fiber reinforced composite is provided by applying the coating to a formed and shaped carrier substrate which is placed into the mold. Plastic is injected into the mold such that the plastic infiltrates the coating during molding and therefore locks the coating to the part after cure. Utilizing the present method substantially enhances the coating bond strength and reduces manufacturing costs by eliminating a post production coating step.

12 Claims, 2 Drawing Sheets ns. METHOD FOR COMOLDING PROPERTY ENHANCING COATINGS TO COMPOSITE ARTICLES

TECHNICAL FIELD

This invention relates to molded composite parts having property enhancing coatings and more particularly to a method for combining a polymer coating with a composite preform for molding into a unitary part.

BACKGROUND

It is common to enhance the properties of a composite part by applying a polymer coating to the surfaces of the part. Reinforced composite materials are used to fabricate many components due to their light weight and high strength. However, in certain applications, such as where high temperatures, chemical exposure or high erosion are expected, such composites are not used, as composite properties will typically degrade in such environments. To overcome this, a barrier coating may be added to a composite part. For example, a glass fiber reinforced epoxy part may have a thermal barrier coating added to it to protect the part at high temperatures. Similarly, other coatings, such as thermoplastic coatings may be applied to enhance properties such as corrosion resistance.

The method used to apply these coatings typically requires first production of the part and post production addition of the desired coating layer by either adhesive bonding or thermal spraying a property protecting material onto the part.

In U.S. Pat. No. 5,021,259, a method of applying a continuous thermoplastic coating in one coating step is discussed. A thermoplastic polymer is applied to a porous metal surface at a temperature which provides a semi-fused highly coarse coating. The coating and surface are then heated such that the coating flows and locks into the pores in the substrate.

In coating molded composites, there is a lack of porosity on the external surfaces and the usual methods of application suffer from the inability to lock the coating to the part. Consequently, other post production steps such as sandblasting to roughen up the surface may be required before coating can be undertaken. If the bond between the coating and part surface is not uniform, there is the potential for separation and localized coating failure.

SUMMARY OF THE INVENTION

It is an object of the present invention to provide a method for applying property enhancing coatings to molded composite parts.

It is a further object to provide a property enhancing coating which is uniformly bonded to the part.

It is a further object to incorporate a property enhancing coating during part molding to reduce production steps and minimize costs.

These and other objects of the present invention are achieved by providing a mold having a mold cavity, a removable carrier substrate, applying a layer of the desired coating material to the carrier substrate, placing the coated carrier into the mold cavity, and injecting a flowable plastic into the mold such that the plastic infiltrates surface irregularities in the coating, solidifying the plastic to lock the coating to the part, removing the part from the mold, and removing the carrier substrate.

In an alternative embodiment of the invention, a fiber preform is assembled around, when interior, or over, when exterior, the carrier substrate to produce, for example, a fiber reinforced part having coated interior or exterior surfaces. When placed in a mold, the resin infiltrates the fibers and fills the coating surface irregularities for comolding into a unitary part.

BRIEF DESCRIPTIONS OF THE DRAWINGS

DETAILED DESCRIPTION OF THE INVENTION

Figure 1:
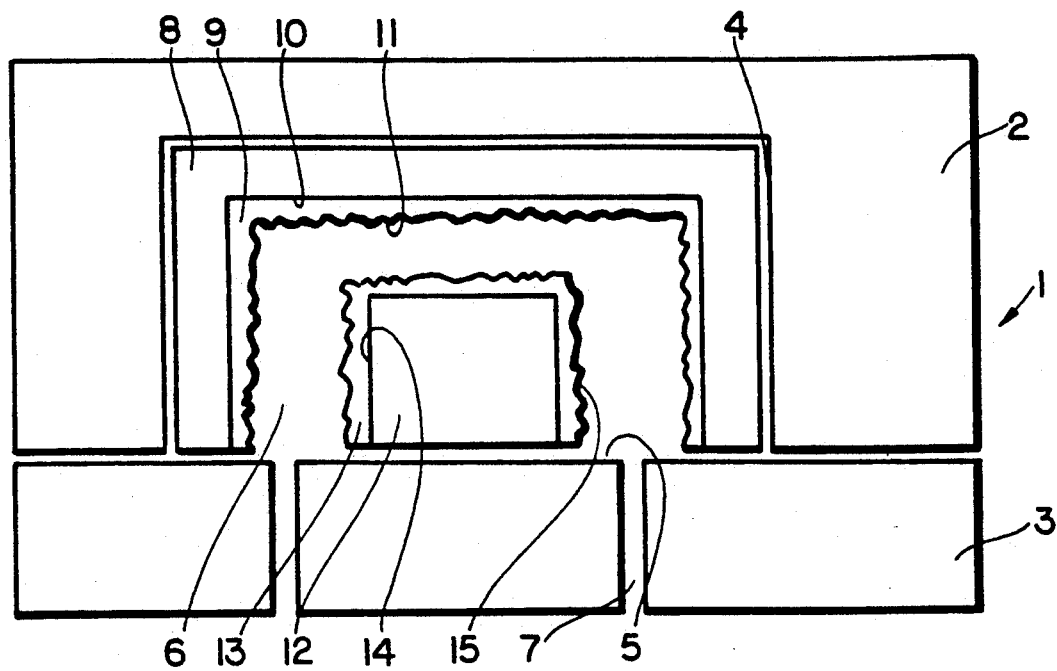
FIG. 1 is a cross-sectional view of a part being molded according to the present invention.

Referring to FIG. 1, a mold 1 has an upper mold section 2 and a lower mold section 3 which form a matched mold. The mold sections have shaped surfaces 4 and 5 which define a cavity 6 which corresponds to a final part configuration. The lower mold section 3 has a pair of passages 7 which provide entry of a flowable plastic into the mold cavity. For ease in illustration, a simple mold is shown. However, the invention is applicable to very complex shape parts which is an advantage of the invention as it allows uniformity of coating of such parts.

The cavity 6 contains an outer carrier substrate 8 which has a coating layer 9 applied to an inner surface 10 thereof. The coating layer 9 has an irregular bonding surface 11. An inner carrier substrate 12 is located centrally on the lower mold surface 5 and has a coating layer 13 applied to outer surfaces 14 thereof. The coating layer 13 has an irregular bonding surface 15. The mold surfaces 4 and 5 are preferably coated first with a mold release agent to ease part removal, though this is optional depending on the resin system chosen and the type of mold material. Such mold release agents are fairly well known in the art.

The carrier substrates are produced from a material removable either by dissolution in a solvent or by melting. The carrier substrates are preferably made out of a low-melting eutectic alloy or other heat sensitive material and are removed after molding by heating to the melting temperature. For example, lead or lead alloys can be used. The carrier substrates may also be made out of a material such as PARAPLAST ™ which is a powder which is meltable for forming a fairly rigid carrier substrate but which is removable by dissolution in water at a temperature of about 180° F., or a glass binder stabilized sand casting material removable by destroying the binder integrity. A rigid polymer or ceramic which is dissolvable could also be used. Some rigidity and surface hardness are required to resist the injection forces which occur when the carrier substrates are subject to pressurized injection molding.

Various techniques can be used to apply the coatings 9 and 13 to the carrier substrates, somewhat dependant on the material chosen. Preferably, a thermal (flame or plasma) spray coating is applied to the carrier surface as this is relatively quick and provides uniform coating. Thermal spraying on the carrier has the advantage of producing a smooth surface against the carrier surface while leaving the bonding surface fairly rough and porous for resin infiltration. Of course, if available in sheet form, the coating material can be directly applied to the carrier surface as a lay-up.

Figure 2:
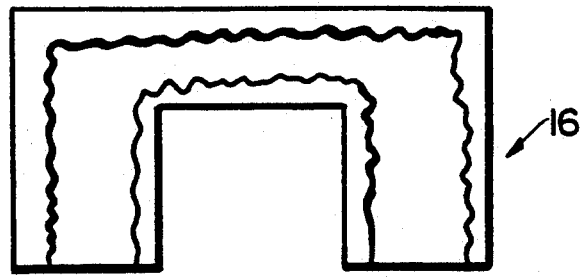
FIG. 2 is a cross-sectional view of the final part.

Referring again to FIG. 1, the coated carrier substrates are loaded into the mold, the mold closed and a flowable plastic injected through passages 7 to fill the mold cavity, which is preferably evacuated of air prior to injection. The plastic flows into the mold and fills the cavity, conforming to and infiltrating the irregularities in the coating surface. If applied by a thermal spray, the coating roughness can be enhanced by adjusting the discharge temperature. For example, a relatively cooler temperature will only partially melt some of the passing particles which then impact the semi-fused surface and create surface irregularities. After plastic infiltration and cure/solidification, a unitary, comolded part 16 is achieved, as shown in FIG. 2, having coated inner and outer surfaces.

A large number of materials usable as coatings could be applied in this matter. Among those are included thermoplastics, such as acrylics, polyamides (nylon), polyimides, polycarbonates, polyketones (PEEK, PEK, PAK), polyetherimides, polyethylenes, polypropylenes, polyphenylene oxides, polyphenylene sulfides, polystyrenes, polyvinylidene chloride, polyether sulfone, polyvinyl chloride and fluoroelastomers such as TEFLON TM, PFA, FEP, etc.

Any resin system may be used with the present invention. Among those usable are epoxy, phenolic, polyurethane, polyester, vinyl ester, bismaleimide, polyamide, etc., or thermoplastic resins such as polyetherether ketone, polyetherimide, polyaryl sulfone or polyamideimide.

Figure 3:
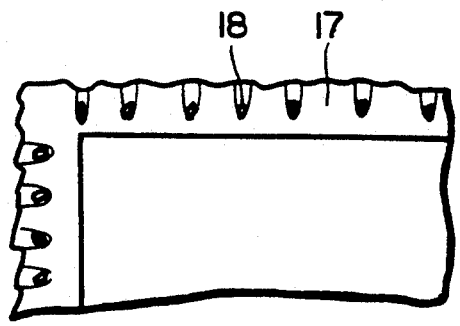
FIG. 3 is an enlarged partial view of a coated substrate.

Another technique to enhance surface irregularity is to apply a distributed metal or ceramic thermal spray over a plastic coating. The hot metal or ceramic particles penetrate into the coating and form surface irregularities. Such particles, distributed randomly on the surface, enhance bond strength without any detrimental impact on coating integrity or properties. Metals such as aluminum, stainless steel or titanium may be used. Ceramic such as zirconia, zircon, silica, alumina, carbides and nitrides may be used. In FIG. 3, a coating layer 17 has metal particles 18 distributed thereover.

The flowable plastic may be either a curable thermosetting plastic, with curing locking the coating to the plastic part or be a thermoplastic which is cooled and becomes locked to the coating during solidification. In either case, a unitary part having a comolded property enhancing coating is provided. Additionally, the invention provides a net shaped part, inclusive of the coating, having relatively exact dimensions and a very smooth coated surface. Prior parts, utilizing after applied coatings, lacked dimensional exactness due to variations in coating thickness. Thus, part to part consistency is assured.

Figure 4:
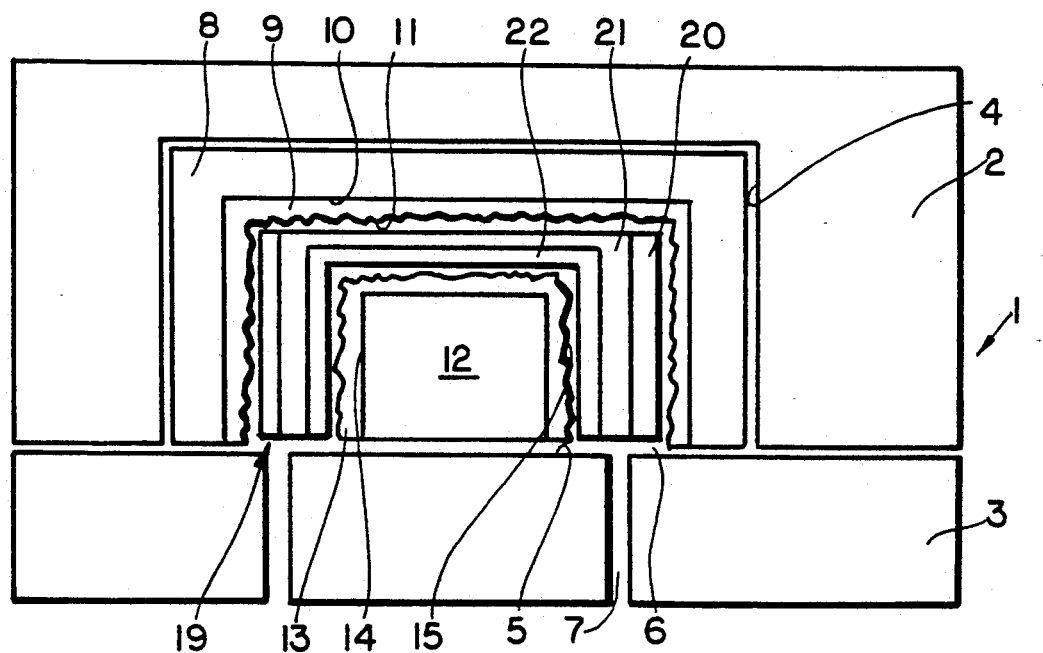
FIG. 4 is a cross-sectional view of a fiber reinforced part being molded according to the present invention.

An alternative embodiment of the invention is shown in FIG. 4. The mold is the same as that shown in FIG. 1. However a fiber preform 19 is located in the cavity 6. A fiber preform is typically made up of a plurality of sheets of dry or preimpregnated fiber stitched or adhesively held together in a shape matching the part shape.

Figure 5:
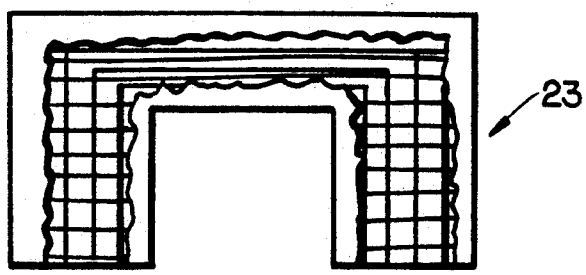
FIG. 5 is a cross sectional view of the final part.

Referring still to FIG. 4, the preform has three fiber layers 20, 21 and 22 located between two coated carrier substrates 8 and 12. Of course, such preforms can have any number of layers, depending on the application. The mold is then closed and plastic injected. As the plastic infiltrates the fiber layers in the preform, it also enters the surface irregularities of the coatings. The plastic is cured or solidified, providing a unitary part 23 with a pair of comolded, securely bonded coatings, as shown in FIG. 5.

The fibers may be of any type, such as fiberglass, graphite, aramid, polybenzimidazole, ceramic, quartz, metal or a hybrid combination of such fibers.

Preferably, a resin transfer molding or reaction injection molding process is used. However, the method is adaptable to use with preimpregnated fiber layer processing techniques, using a vacuum/autoclave system for producing molded parts. In either case, the matrix material fills the fibers and surface pores, wetting out any reinforcing material and cures as a unitary part in the shape of the mold.

The method of the invention allows for masking of selective areas of the mold or preform, prior to molding, to provide coatings only on selected areas but assures full bonding with the comolded part.

While simple mold shapes are shown for illustration purposes, an advantage of the invention is that complex parts of different shapes can be prepared in a single mold by the proper selection and design of the carrier substrate. Being composed of, for example, low melting alloys, allows ease in producing consistent, net shape, multiple carrier substrates, avoiding the cost of individual complex shape high pressure molds. Tooling turnaround is thus enhanced, increasing equipment utilization and maximizing part production.

The invention substantially decreases manufacturing time and the cost of producing coated composite parts. The technique also allows for more control over the uniformity and thickness of the coating, enhances bonding and provides dimensional stability of the final part. The matrix material wets out the coating during injection to form a much stronger bond than which was previously encountered.

While preferred embodiments of the present invention have been shown and described, it will be understood by those skilled in the art that various changes or modifications could be made without varying from the scope of the present invention.

We claim:

1. A method for comolding a property enhancing coating and a polymer composite part comprising:
   providing a mold having a mold cavity,
   providing a removable carrier substrate having a desired shape,
   applying a coating material to a surface of the carrier substrate,
   distributing metallic or ceramic particles over the coating material to produce an irregular bonding surface,
   loading the coated carrier substrate into the mold cavity,
   placing a fiber preform composed of one or more fiber layers within the mold,
   injecting flowable polymer into the mold such that the polymer fills the mold cavity and infiltrates the fiber preform and the irregular bonding surface and,
   solidifying the polymer to form the part and lock the coating to the part.

2. The method of claim 1 wherein the property enhancing coating is from the group consisting of acrylic polymers, polyamides, polyimides, polycarbonates, polyketones, polyethylenes, polypropylenes, polyphenylene oxides, polyphenylene sulfides, polystyrenes, polyvinylidene chloride, polyether sulfone, polyvinyl chloride and fluoroelastomers.

3. The method of claim 1 wherein the polymer is a resin system from the group consisting of epoxy, phenolic, polyurethane, polyester, vinyl ester, bismaleimide, polyamide, polyetherether ketone, polyetherimide, polyaryl sulfone, bis-cyclobutadiene or polyamideimide.

4. The method of claim 1 further comprising:
removing the coated part and carrier substrate from the mold and removing the carrier substrate.

5. The method of claim 4 wherein the carrier substrate is removed by heating to melt the carrier substrate.

6. The method of claim 4 wherein the carrier substrate is removed by treating with a solvent to dissolve or disassociate the carrier substrate.

7. The method of claim 1 wherein the fiber preform is combined with the carrier substrate prior to loading into the mold.

8. The method of claim 1 wherein the coating material is applied by a thermal spray.

9. The method of claim 8 further comprising adjusting the thermal spray parameter to provide the irregular bonding surface.

10. The method of claim 1 wherein the metal particles are from the group consisting of aluminum, stainless steel, titanium, nickel, copper, iron, and magnesium.

11. The method of claim 1 wherein the ceramic particles are from the group consisting of zirconia, zircon, silica, alumina, carbides and nitrides.

12. The method of claim 1 wherein the fiber layers are preimpregnated fiber sheets.

* * * * *